United States Patent [19]
Fritsch et al.

[11] Patent Number: 4,803,919
[45] Date of Patent: Feb. 14, 1989

[54] COOKING APPARATUS FOR COMMUNITIES

[75] Inventors: Edgar Fritsch; Norbert Fritsch, both of Wittenheim, France

[73] Assignee: Robert Fritsch S.A., Whittenheim, France

[21] Appl. No.: 58,284

[22] Filed: Jun. 4, 1987

[30] Foreign Application Priority Data

Jun. 6, 1986 [FR] France .............................. 86 08325

[51] Int. Cl.⁴ .................. A47J 27/00; A47J 27/08
[52] U.S. Cl. .................................. 99/340; 99/324;
99/472; 137/625.46; 220/316
[58] Field of Search ................ 99/339, 472, 473, 474,
99/475, 337, 324, 325, 330, 340; 220/316;
215/313; D7/358; 137/625.46, 625.17, 625.42,
588; 417/181; 219/440; 126/373, 289

[56] References Cited

U.S. PATENT DOCUMENTS 2,620,882 12/1952 Peterson et al. ...................... 137/588
4,135,640 1/1979 MacQuilkin et al. ................ 220/316
4,161,191 7/1979 Ranger et al. ................... 137/625.46
4,346,836 8/1982 Nagel .................................. 126/389

FOREIGN PATENT DOCUMENTS 864367 4/1941 France .................................. 99/324

Primary Examiner—Henry J. Recla
Assistant Examiner—Linda J. Sholl
Attorney, Agent, or Firm—Sandler & Greenblum

[57] ABSTRACT

A cooking apparatus including a cooking vat and a hinged lid responsive to a control mechanism and provided with devices for vacuumizing and pressurizing the vat, respectively. The hinged lid includes a single opening lined with a tubular sleeve communicating at its lower end with the vat and, at its upper end, with a device for selectively communicating the vacuumizing or pressurizing device with the vat. The vacuumizing and pressurizing devices include a fixed member secured to the top surface of the lid which cooperates with a movable member for selectively connecting the vat to the vacuumizing device or the pressurizing device, as a function of cooking requirements. The pressurizing device is further provided with a safety valve.

20 Claims, 2 Drawing Sheets

1

COOKING APPARATUS FOR COMMUNITIES

BACKGROUND OF THE INVENTION

The present invention relates to cooking apparatus in general and has particular reference to a cooking apparatus for community kitchens which comprises, inter alia, a cooking vat or vessel and a hinged lid therefor actuated by a control mechanism and provided with means for vacuumizing and pressurizing the cooking vat as a function of the particular food to be cooked.

THE PRIOR ART

In some circumstances, when it is desired to preserve as much as possible the food-value of various foods, it is sometimes desirable to cook the food at temperatures above or below 100° C. (212° F.). When cooking at a temperature below 100° C., it is preferable to cook the food in bulk and in vacuo, whereas when cooking at a temperature above 100° C. the long cooking time required by conventional casseroles and saucepans is reduced by resorting to pressure cooking means.

Thus, in most community kitchens two separate cooking apparatus are used, one for cooking food in bulk and in vacuo, and another for pressure cooking. However, this double line of cooking appliances involves not only a substantial increment in their cost but also more room space.

Besides, a cooking apparatus comprising combination means for vacuumizing and pressurizing the food-containing vat is already known. Therefore, this cooking apparatus comprises in a substantially similar way the features of a pressure cooker of the type commonly used for pressure cooking. Therefore, it comprises a vat or like vessel closed by a detachable lid provided with two apertures, i.e. one for connecting the vat to vacuumizing means and another for connecting the vat to pressurizing means.

The vacuumizing means consists as a rule of a substantially T-shaped tubular member attached to the lid and having one arm connected to the inner space of the vat. The ends of the other two arms of the T comprise a mercury pressure-gage for displaying the vacuum obtained in the vat and a slide valve, respectively. This slide valve is adapted to be connected to a vacuum pump consisting of a venturi connected in turn to a water-supply tap. On the other hand, the means for pressurizing the vat consists of a safety valve device cooperating with the other aperture of the detachable lid and permitting of limiting the pressure in the vat.

This known type of cooking apparatus is attended by various inconveniences resulting essentially from sealing deficiencies in the joint between the detachable lid and the top edge of the vat. In fact, this lid is provided necessarily with two orifices for receiving the means for pressurizing and vacuumizing the vat, respectively. Obviously, this multiplication of the number of apertures formed through the detachable lid is most likely to jeopardize the safety of operation of the cooking apparatus. Now, it is worth pointing out that when air is allowed to seep into the pan during a vacuum cooking operation, the inner temperature rises to undesired values, thus destroying the food-value of certain food components. On the other hand, when the pressure is reduced in the vat for the same reason during a pressure cooking operation, the cooking time is increased considerably.

SUMMARY OF THE INVENTION

It is therefore the primary object of the present invention to avoid the various inconveniences set forth hereinabove by providing a cooking apparatus for community kitchens which comprises, inter alia, a cooking vat or like vessel and a hinged lid responsive to a control mechanism and provided with means for vacuumizing and means for pressurizing the cooking pan, respectively, this cooking apparatus being characterised in that the hinged lid comprises a single bore lined by a tubular sleeve opening at its lower end into the cooking vat and at its upper end into means for selectively vacuumizing or pressurizing the cooking vat, which comprise a fixed member secured to the top of the hinged lid and adapted to cooperate with a movable member provided with vacuumizing means, and pressurizing means provided with a safety valve.

In a first form of embodiment of the invention, the movable member is a slide valve movable along a rectilinear path.

The essential advantages resulting from this invention lie essentially in that the hinged lid comprises a single aperture or bore in which a tubular sleeve or pipe is fitted and connected directly to means for selectively vacuumizing or pressurizing the inner space of the vat. With this arrangement, the fluid-tightness of the cooking apparatus and consequently its dependability are increased considerably.

The invention will now be described more in detail with reference to the accompanying drawing.

DESCRIPTION OF THE PREFERRED EMBODIMENT

Figure 1:
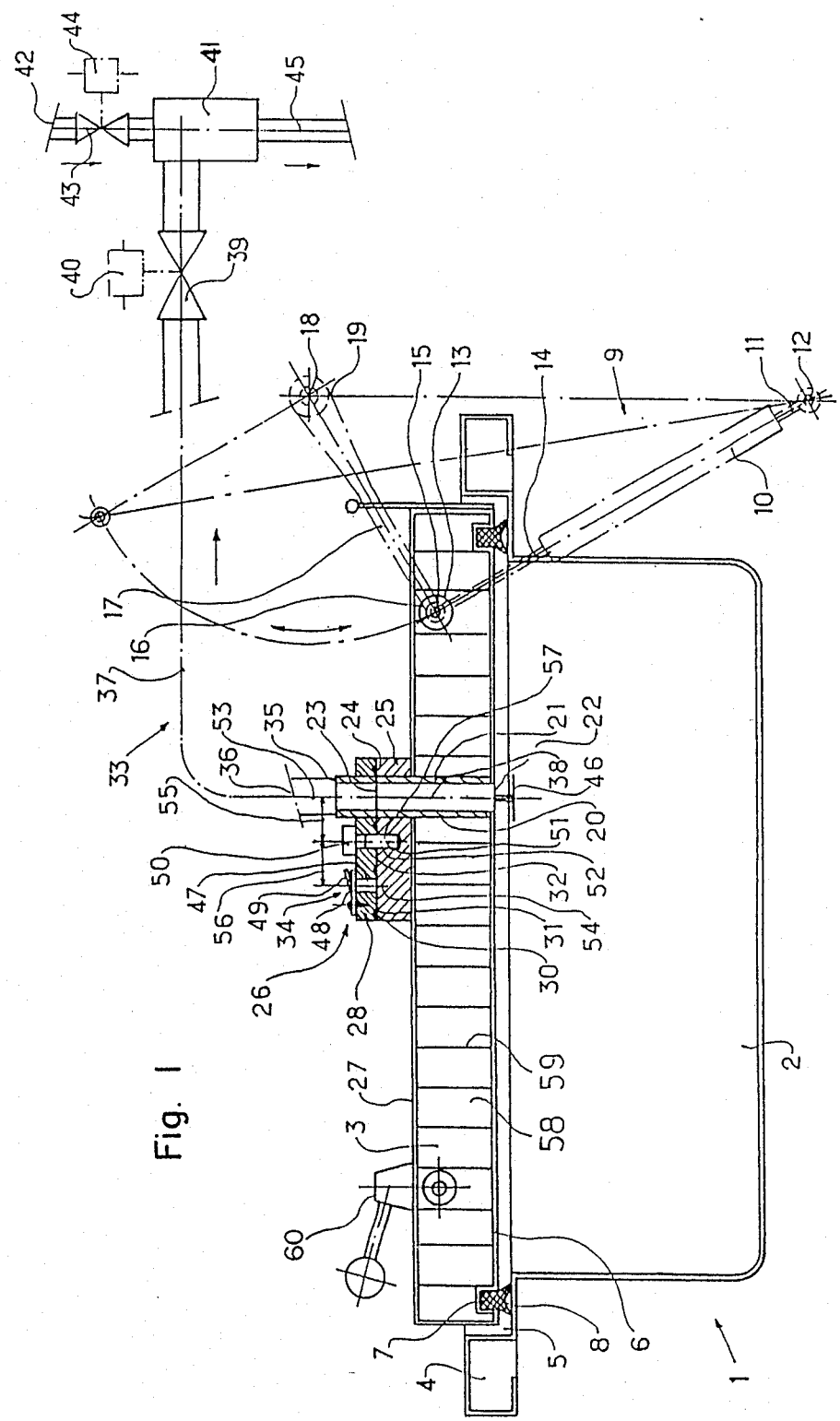
FIG. 1 is an elevational, part-diagrammatic view of the cooking apparatus of the present invention.

The cooking apparatus 1 consists essentially of a cooking vat 2 and of a hinged lid 3. The upper edge of the cooking vat 2 comprises an outer peripheral hollow rim 4 of substantially square cross-section which defines an internal annular ledge 5 engageable by the edge of the hinged lid 3. The bottom face of lid 3 comprises a peripheral annular groove 7 in which a gasket 8 is fitted so that when the hinged lid 3 is closed, the gasket 8 is pressed in sealing engagement against the annular ledge 5 of said peripheral rim 4.

The hinged lid 3 is responsive to a control mechanism 9 comprising at least one pressure-actuated cylinder 10 having one end 11 pivotally connected to a fixed pivot pin 12 and its other end pivotally connected via a piston rod 14 to a pivot pin 15 carried by one end 16 of at least one arm 17. This arm 17 has its opposite end 19 pivotally connected to a fixed pin 18.

According to an essential feature of the present invention a single vertical bore 20 is formed through the hinged lid 3 and a fixed tubular sleeve 21 is fitted in this bore 20. The lower end 22 of sleeve 21 opens into the cooking vat 2 and the upper end 23 of sleeve 21 is flush with the bottom face 24 of a fixed member 25. This fixed member 25 is part of a device designed for selectively pressurizing or vacuumizing the cooking vat 2, and is secured to the top surface 27 of hinged lid 3. The selection device 26 also comprises a movable member 28 disposed atop, and adapted to cooperate with, said fixed member 25. The fluid tightness between the fixed member 25 and the movable member 28 is obtained by disposing at least one packing ring 30 in one or more grooves 31 formed in the bottom face 32 of movable member 28. This movable member 28 also comprises vacuumizing means 33 and pressurizing means 34.

The vacuumizing means 33 comprise a suction pipe or union 35 rigidly connected to the movable member 28 and fitted at one end 36 of a hose 37. When the cooking apparatus 1 is used for vacuum cooking, the suction pipe 35 is brought to a position of axial alignment with tubular sleeve 21. The hose 37, provided with a shut-off valve 39 actuated by a solenoid 40, is connected to a vacuumizing suction device 41 connected in turn to a water supply conduit 42 also provided with a shut-off valve 43 actuated by another solenoid 44, an exhaust-pipe 45 being connected to said suction device 41. To prevent the food contained in the cooking vat 2 from being exhausted when vacuumizing the vat, the lower end 22 of sleeve 21 is provided with a baffle-plate 46.

The vacuumizing means operate as follows: firstly, both shut off valves 39 and 43 are opened, and the water flowing through suction device 41 causes a vacuum to be exerted through the hose 37. When the desired vacuum valve is attained, the solenoid 40 is energized and valve 39 is shut off. Then, the other shut-off valve 43 is also turned off by energizing the other solenoid 44.

The means for pressurizing the vat 2 consists of a vertical nozzle 47 fitted in movable member 28. This nozzle 47 has a relatively small diameter and comprises at its upper end 48 a safety valve 49 opening when an overpressure develops in cooking vat 2. When the cooking apparatus 1 is used for pressure cooking, the axis of nozzle 47 is brought into alignment with the vertical axis 38 of sleeve 21.

According to a first and preferred form of embodiment of the present invention, the movable member 28 consists of a disk adapted to rotate about a central pivot pin 50. This pivot pin 50 may advantageously consist of a screw having a threaded portion 51 engaged in a tapped hole 52 formed in the fixed member 25. The vertical axis 53 of suction pipe 35 and consequently the vertical axis 38 of sleeve 21 and the vertical axis 54 of nozzle 47 are equally spaced (as shown at 55, 56) from the vertical axis 57 of pivot pin 50. The vertical axes 53 and 54 are disposed on either side of vertical axis 57.

The hinged lid 3 comprises a top plate 27 and a bottom plate 6 assembled to constitute a sealed hollow disk providing a thermal insulation on the top of the cooking apparatus which reduces appreciably heat losses due to the presence of an air cushion 58.

On the other hand, this hinged lid 3 also comprises, between its bottom wall 6 and its top wall 27, a honeycomb- or grating-like stiffening structure 59 imparting the necessary flatness and rigidity to the hinged lid 3, thus eliminating any distortion thereof which might otherwise develop as a consequence of the degree of vacuum or pressure obtained in the cooking vat 2.

Figure 2:
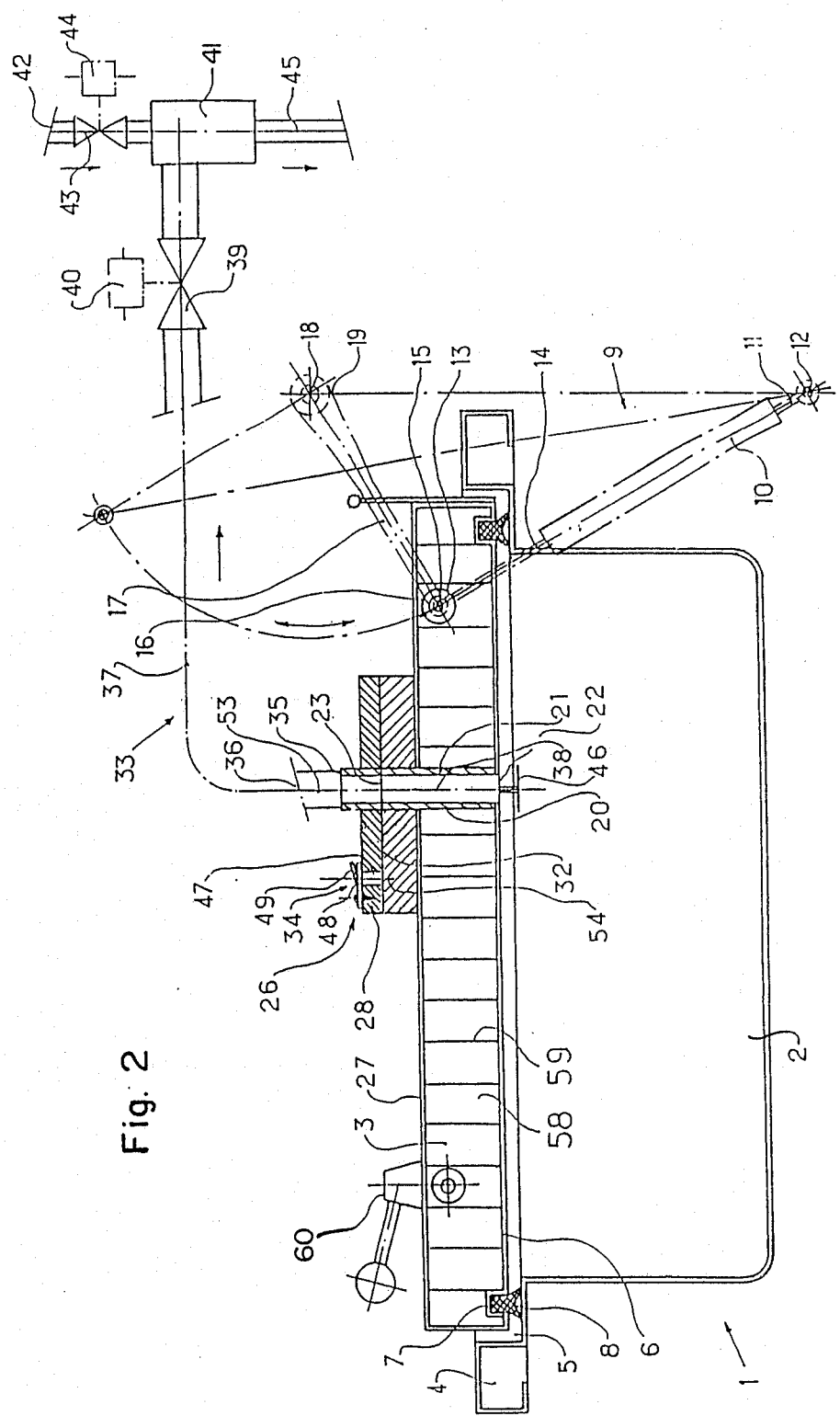
FIG. 2 illustrates an alternate embodiment of the invention.

In a modified form of embodiment, as shown in FIG. 2 the movable member 28 consists of a slide valve adapted to be moved axially for positioning either the suction pipe 35 or the nozzle 47 in axial alignment with the vertical axis 38 of sleeve 21.

The movable member 28 may be actuated either manually or by mechanical, electric, hydraulic or other suitable means for moving automatically this member 28 from one position to another.

Besides, the hinged lid 3 is provided with locking and/or air-venting means 60.

What is claimed is:

1. A cooking apparatus comprising:
   (a) a cooking vat having an interior;
   (b) a lid movably attached to said cooking vat;
   (c) a single opening extending through said lid, said single opening having an inner end and an outer end, said inner end communicating said single opening with said interior of said cooking vat;
   (d) means for vacuumizing said cooking vat;
   (e) means for pressurizing said cooking vat; and
   (f) means for selectively operably associating said outer end of said single opening with said means for vacuumizing said cooking vat and said means for pressurizing said cooking vat.

2. The cooking apparatus of claim 1, wherein said movably attached lid is pivotally attached to said cooking vat.

3. The cooking apparatus of claim 1, wherein said means for selectively operably associating comprises a member movably attached to said lid.

4. The cooking apparatus of claim 3, wherein said means for pressuzing said cooking vat comprises a first aperture extending through said member.

5. The cooking apparatus of claim 4, wherein said means for pressurizing said cooking vat further comprises a safety valve connected to said first aperture.

6. The cooking apparatus of claim 3, wherein said means for vacuumizing said cooking vat comprises a first aperture extending through said member.

7. The cooking apparatus of claim 4, wherein said means for vacuumizing said cooking vat comprises a second aperture extending through said member.

8. The cooking apparatus of claim 7, wherein said member of said means for selectively operably associating comprises means for disposing one of said first aperture and said second aperture in substantial axial alignment with said single opening.

9. The cooking apparatus of claim 7, wherein said member comprises a disk rotatable about a pivot axis, functioning as a rotary valve.

10. The cooking apparatus of claim 9, wherein the respective axes of said first aperture and said second aperture are disposed on either side of said pivot axis, the distance between said pivot axis and the axis of said first aperture being substantially equal to the distance between said pivot axis and the axis of said second aperture, each of which distances is substantially equal to the distance between said pivot axis and the axis of said single opening.

11. The cooking apparatus of claim 7, wherein said member comprises an element movable in a substantially rectilinear path, functioning as a slide valve.

12. The cooking apparatus of claim 1, wherein said means for vacuumizing said cooking vat comprises a conduit selectively operably associated with said single opening and communicating with a vacuum source.

13. The cooking apparatus of claim 12, wherein said means for vacuumizing further comprises a shut-off valve connected in said conduit between said single opening and said vacuum source.

14. The cooking apparatus of claim 13, wherein said vacuum source comprises a suction device communicating with said conduit, a water supply conduit for supplying water to said suction device, and a water drainage conduit for draining water from said suction device.

15. The cooking apparatus of claim 14, wherein said vacuum source further comprises a shut-off valve in said water supply conduit.

16. The cooking apparatus of claim 15, wherein said shut-off valves are solenoid-operated.

17. The cooking apparatus of claim 1, further comprising a baffle plate connected proximate to said inner end of said single opening.

18. The cooking apparatus of claim 7, further comprising a sleeve located in said second aperture which extends beyond said member.

19. The cooking apparatus of claim 1, further comprising a gasket positioned between said lid and said cooking vat.

20. The cooking apparatus of claim 7, further comprising a fixed member positioned between said movably attached member and said lid, said apparatus further comprising a sleeve extending through both said single opening and said fixed member.

* * * * *